MAGNETIC RECORDING AND VERIFYING SYSTEM

Filed March 27, 1964 2 Sheets-Sheet 1

INVENTORS
MAX M. LIANG
HAJIME YOSHII
BY
Stuart Lubitz
ATTORNEY

INVENTORS
MAX M. LIANG
HAJIME YOSHII
BY
Stuart Lubitz
ATTORNEY

United States Patent Office 3,359,548

Patented Dec. 19, 1967

3,359,548

MAGNETIC RECORDING AND VERIFYING SYSTEM

Hajime Yoshii, Morgan Hill, and Max M. Liang, San Mateo, Calif., assignors to Ampex Corporation, Redwood City, Calif., a corporation of California Filed Mar. 27, 1964, Ser. No. 355,260
6 Claims. (Cl. 340—174.1)

ABSTRACT OF THE DISCLOSURE

Apparatus for verification of digital data immediately upon recording, wherein a single, dual-purpose, read-write head includes write and read windings coupled to write and read circuit means respectively. Binary bits are recorded in a magnetic medium disposed adjacent the single head, wherein write current introduced to the write winding is terminated after a first portion of a bit duration interval T and a signal indicative of the recorded bit is induced in the read winding during a second portion of the bit duration interval T. The signal induced in the read winding is compared in a logic circuit, to the original input to provide an "error present" or "error absent" signal, indicating improper or proper recording respectively.

In the recording of digital data on a magnetic medium, such as magnetic tape, it is desirable to be able to verify that the data actually recorded is that which is intended to be recorded. Where some type of verification is not performed, the danger exists that information will be either lost due to "dropout" often caused by imperfections in the recording surface or incorrectly recorded due to some component malfunction.

Most presently used magnetic tape recording systems employ a separate read heads and write heads for each channel and accomplish verification either by performing a parity check by reading the tape after writing or by reading the tape and comparing it with the output of a buffer storing the data intended to be written. Both of these techniques are rather costly, either in time or hardware required.

U.S. patent application Ser. No. 347,936 filed on Feb. 27, 1964, by Michael Markakis and assigned to the same assignee as the present application discloses a method and apparatus for recording digital information utilizing a single read-write head so that each recorded bit can be read immediately after it is written. The present invention is directed to an apparatus which advantageously employs the concepts set forth in the cited patent application to enable digital data to be recorded and immediately verified without performing a parity check or requiring the use of buffer equipment. Apparatus constructed in accordance with the invention enables recorded data to be verified on a bit-by-bit basis and thus is superior to parity checking which detects only an odd number of errors. Elimination of the buffer requirement of course represents a considerable cost saving.

Briefly, in a preferred embodiment of the invention, a single read-write head is provided which is coupled to the magnetic medium and has at least one winding coupled thereto. Binary digits to be recorded are serially entered into an input register and stored for at least an interval T. The time interval T may be arbitrarily long for random rate data acquisition and storage or as described hereinafter it may be a relatively short finite duration. Dependent upon the state of the bit in the input register, current can be directed through the head winding to consequently orient the flux on the medium in opposite directions for the two possible bit states. The head and medium can either be moved or held stationary with respect to one another during recording. The current in the head winding is terminated during a first portion of the interval T and during a second portion of the interval T the head and medium are moved relative to one another to induce a signal in the head winding indicative of the state of the recorded bit. The signal induced in the head winding is applied to the input of a logical exclusive Or circuit along with the output of the input register. The exclusive Or circuit of course provides a no "error" outputs signal when the states of the bit read from the medium and the bits stored in the input register match.

The novel features that are considered characteristic of this invention are set forth with particularity in the appended claims. The invention itself both as to its organization and method of operation, as well as additional objects and advantages thereof, will best be understood from the following description when read in connection with the accompanying drawing, in which:

Figure 1:
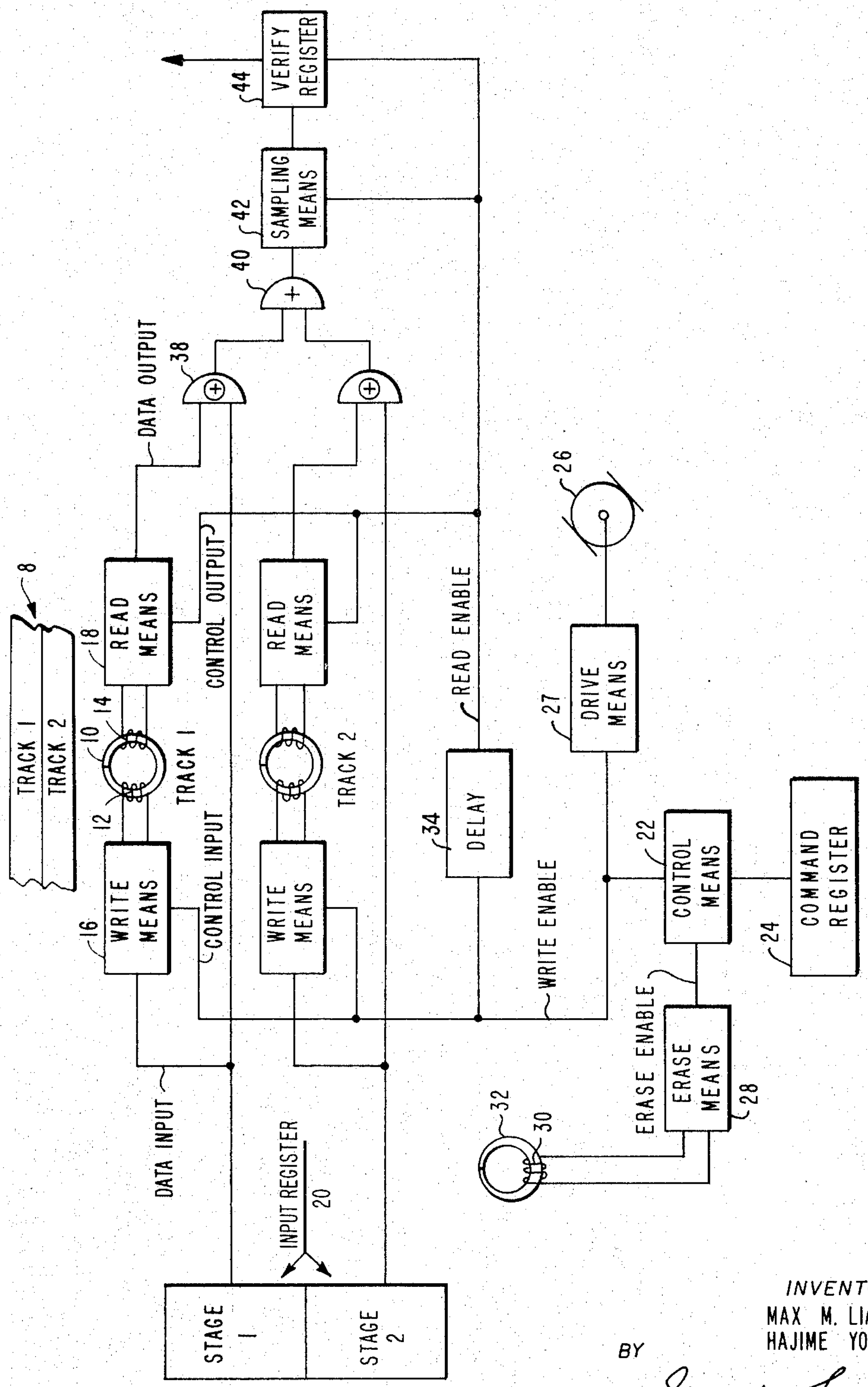
FIGURE 1 is a block diagram of a recording and verification system constructed in accordance with the present invention.

Attention is now called to FIGURE 1 which comprises a block diagram illustrating a recording and verification system constructed in accordance with the present invention. The illustrative system of FIGURE 1 employs only two channels and a movable magnetic medium 8 having two data recording tracks but however, it should be understood that the invention herein is applicable to a system utilizing any number of tracks.

Coupled to each of the recording tracks is a magnetic head 10 which has a pair of windings 12 and 14 coupled thereto. The winding 12 is connected to the output of a write means 16 while the read winding 14 is connected to the input of a read means 18.

A source of digital data comprising an input register 20 is provided. The illustrated input register 20 consists of two stages, each stage capable of storing a single binary digit. The output of stage 1 of the input register 20 is connected to the input of the write means 16 of track 1 and the output of stage 2 is connected to the input of the write means of track 2.

The write means is provided with both an information input terminal and a control terminal. The outputs of the input register 20 are connected to the write means information input terminals. The write means control terminals are connected to the output of a control means 22 which is responsive to information stored in a command register 24. The control means 22 is provided with at least two output terminals. The first or "write enable" output terminal is connected directly to the control terminals of the write means 16 and in a preferred incremental positioning embodiment of the invention, to a tape drive motor or incremental stepping motor 26 via a drive means or motor controller 27. The second or "erase enable" output terminal of the control means is connected to the input of an erase means 28 whose output is connected to a winding 30 coupled to an erase head 32. The head 32 is coupled to all of the system recording tracks, that is it erases across the entire width of the tape.

The write enable output line of the control means 22 is connected through a delay circuit 34 to a read enable line. The read enable line is connected to the control input terminals of each of the read means 18. In addition, the read enable line is connected to the sampling means 42 and to the verify register 44. The data output terminal of each read means 18 is connected to the input of a logical exclusive Or circuit 38 along with the output of the corresponding stage of the input register 20. The output of each exclusive Or circuit 38 is connected to the input of an Or gate 40.

Figure 2:
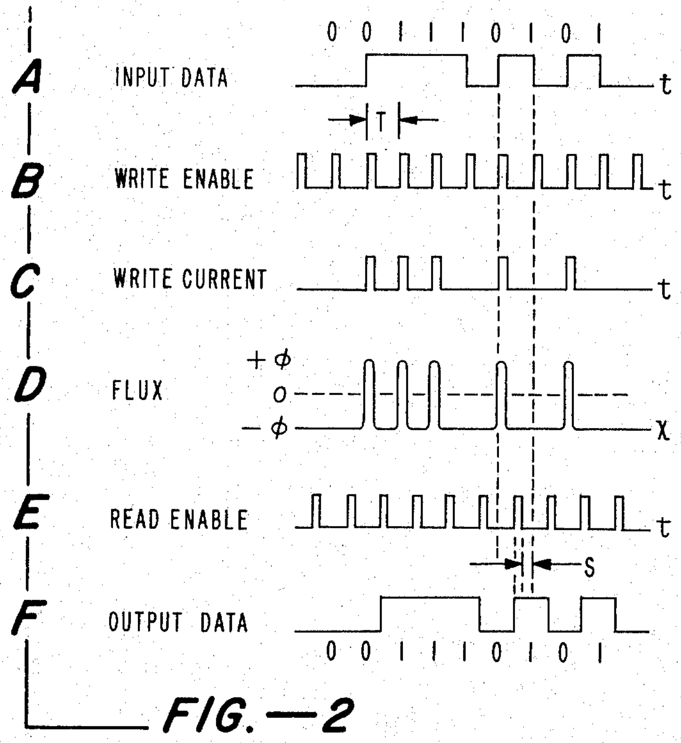
FIGURE 2 is a waveform chart illustrating various waveforms encountered at different points in the apparatus of FIGURE 1.

In order to understand the operation of the system of FIGURE 1, attention is called to the waveform charts of FIGURE 2. As noted, the recording system disclosed herein employs the method of recording discussed in the above-cited U.S. patent application Serial No. 347,936. In that patent application, two methods of recording are discussed both of which do not require current to be maintained in the winding of a head in the interval between the recording of successive digits. These two recording methods are referred to in that patent application as a return-to-zero (RZ) method and a return-to-bias (RB) recording method. Although either of these methods can be advantageously utilized in a system constructed in accordance with the present invention, the waveforms illustrated in FIGURE 2 are directed toward the RB recording method which appears to have certain advantages over the RZ method, as discussed in the cited patent application.

According to the RB method of recording, the residual flux on a magnetic recording medium is initially oriented in a first direction. In order to bias the flux on the magnetic medium in a first direction prior to recording, an erase command is entered into the command register 24. In response thereto, the control means 22 applies a D.C. command to the erase enable line. This causes the erase means 28 to energize the winding 30 on erase head 32 which orients all the tracks on the magnetic medium in a first direction. The motor 26 or other motors (not shown) cause movement of the magnetic medium 8 with respect to the erase head 32. In order to subsequently record "0" binary digits, the bias flux orientation is left unchanged. On the other hand, in order to record binary "1's," the orientation of the residual flux on the magnetic medium is reversed.

With the above in mind, consider the waveform illustrated in FIGURE 2(*a*) which appears on one output of the input register 20 and which represents an arbitrary series of binary digits illustrated as a function of time. It will be noted that "1" bits are arbitrarily represented by a high level signal and "0" bits are arbitrarily represented by a low level signal. In accordance with the invention, each bit is stored in the input register for some minimum interval which will be referred to as T. In order to write the information stored in the input register onto the recording tracks and to verify the written information, an appropriate command is entered into the command register 24 by means (not shown) and the control means 22 in turn applies an output signal on the write enable line. FIGURE 2(*b*) illustrates the wave form appearing on the write enable line and it will be noted that a minimum interval T exists between the application of adjacent write enable pulses by the control means 22 to the write enable line. The application of a pulse to the write enable line energizes the motor 26 which in turn initiates movement of the magnetic recording medium with respect to the heads 10. As with all mechanical or electromechanical systems, there is a lag, on the order of milliseconds, before the magnetic medium actually begins to move. During this lag interval, the write means 16 responds to the output of the input register and applies an appropriate recording signal to the write winding 12. The write means 16 can merely comprise an amplifier which is gated in response to pulses appearing on its control input terminal.

FIGURE 2(*c*) illustrates the write current developed in the write winding 12 when an RB method of recording is utilized to represent the arbitrary series of bits shown in line *a*. More particularly, in order to represent "0" bits, the biased flux orientation on the magnetic medium is left unchanged. On the other hand, in order to represent "1" bits, a current pulse is developed in the write winding 12 to oppositely orient the magnetic medium flux. The flux variations are illustrated in FIGURE 2(*d*) as a function of the displacement along the medium. It should be apparent that "0's" are represented by the biased flux state $-\phi$ and that "1's" are represented by the flux state $+\phi$.

It can be seen in FIGURE 2 that the write enable pulses in FIGURE 2(*b*) are all developed at the beginning of the interval T during which each bit is stored in the input register. After the delay introduced by delay circuit 34, a pulse is developed on the read enable line and applied to the control input terminals of the read means 18. The read means 18 can merely comprise an amplifier and a read register which is gated by the application of a pulse to the control input terminal. Thus, after the termination of the write enable pulse which permits the information stored in the input register to be recorded on the magnetic medium, and after the magnetic medium has begun to move with respect to the heads, a read enable pulse is generated which couples the signal induced in the read winding 14 to the input of a read or buffer register (not shown), and then to the exclusive Or circuit 38. The read register (not shown) stores the tape data signal induced in the read winding 14, thus forming an output data illustrated in FIGURE 2(*f*) (assuming no error). It should be understood that a simplified form of the invention does not require a read register.

The exclusive Or circuit 38 functions to compare the bit read by the read means 18 with the output of the input register 20. If the read bit stored in the read register (not shown) does not match the bit stored in the corresponding stage of the input register, the exclusive Or gate 38 will provide an error present output signal. This error present output signal will be fed to the Or gate 40, and then sampled at the correct time by sampling means 42 to indicate that an error in recording has occurred. On the other hand, if the bit read from each recording track matches the corresponding bit stored in the input register 20, Or gate 40 will provide an error absent output signal. This verifies that the recorded information matches the information intended to be recorded.

Due to the delays inherent in the motor 26 and the action of the delay circuit 34, the output data are delayed time wise with respect to the input data. During the time interval S, between the read enable line energization and the next adjacent write enable line energization (see FIGURES 2*b* and *e*), the output data read off the tape concur with the input data written onto tape if no error has occurred (see FIGURES 2*a* and *f*). The purpose of the sampling means 42 is to sample the output signal during this time interval S (FIGURE 2(*f*)) and transfer error absent/error present information to the verify register 44 for storage and use. During the time interval S the read enable line and the write enable line transmits no output signals or transients and the output data is at a steady state.

In the preferred embodiment shown in FIGURE 1, the timing hazards due to the read enable line and the write enable line transients are eliminated with the following sequence of events:

(1) With the read enable line energized, the sampling means 42 does not sample and the verify register 44 is reset to no error state. The sampling means 40 contains an inhibit means (not shown) which inhibits sampling with the read enable line energized. The verify register 44 contains a reset diode (not shown) connected to the read enable line which is reset by the energization of the read enable line.

(2) As the read enable line is de-energized or transits from an up state to a down state the sampling means 42 commences sampling and continues to sample for a short period controlled by a timing circuit (not shown) in the sampling means 42. The sampling period is set to 0.1 S, or a smaller time interval.

(3) At the end of 0.1 S, or smaller, sampling period, the sampling means 42 does not sample until the read enable line goes up or is energized in the next adjacent time interval T. If the output of the logical Or gate 40 shows an error present signal during the sampling period, the sampling means 42 sets the register 44 to an error state. If the output of the logical Or gate 40 shows an error absent signal during the sampling period, the sampling means 42 leaves the register 44 in the previously reset no error state. The sequence of events described above assures verification for any arbitrarily long time interval T necessary in random rate data acquisition and storage of data.

Figure 3:
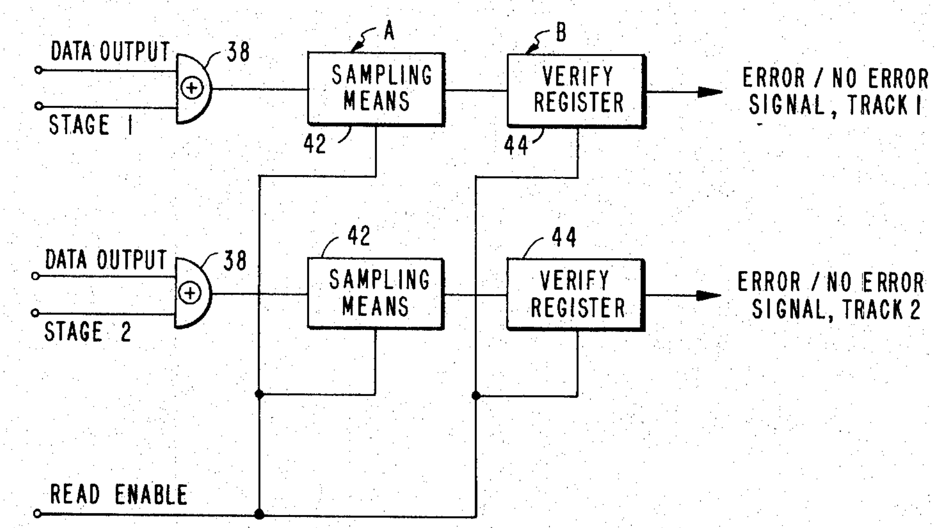
FIGURE 3 is a block diagram of an alternate embodiment of a recording and verification system constructed in accordance with the present invention.

FIGURE 3 shows an alternate embodiment wherein a sampling means 42 and verify register 44 are provided for each recorded track such as track 1 and track 2. The provision of such sampling means and verify register enables the particular track on which an error occurs to be located. This embodiment also eliminates any need for an Or circuit such as Or gate 40. The cooperation of the exclusive Or circuit 38, the sampling means 42 and the verify register 44 is otherwise identical with the operation described above in regards to the preferred embodiment in FIGURE 1.

From the foregoing, it should be appreciated that a magnetic recording system has been disclosed herein in which binary digits can be recorded and immediately read by a single magnetic head to thus permit an exclusive Or circuit to compare the read bit with the bit intended to be recorded. Although the illustrated embodiment of the invention has utilized an RB recording method, it should be apparent that the record and verify system is equally as applicable to other methods of recording in which a write current does not have to be maintained during the interval between the recording of successive bits. Thus, the invention can be very satisfactorily utilized with RZ recording methods. Further, although the invention has been illustrated in a system in which the assumption has been made that the magnetic recording medium is moved incrementally, the invention can be advantageously used in systems in which the magnetic recording medium is moved continually. Of course, if the medium is moved continually, the lag interval referred to will not be encountered and more precise timing signals would have to be generated. It is further pointed out that the Hall effect heads could be employed in an embodiment of the invention in lieu of the illustrated heads thus eliminating the necessity of providing relative motion between the heads and medium in order to read the recorded bits. If Hall effect heads are employed, an appropriate readjustment of the timing sequence would of course be necessary.

What is claimed is:

1. In combination with a source of successively provided binary digits randomly defining "1" and "0" states, apparatus for recording said digits in a recording medium and for verifying that said digits are properly recorded by sensing the recorded digits in the medium, said apparatus comprising:

a magnetic medium;

a single magnetic head coupled to said medium;

a write and a read winding coupled to said head;

write means responsive to the "1" and "0" states of said successively provided binary digits for successively initiating current in said write winding for orienting the flux in the magnetic medium to selectively indicate said "1" or "0" state;

motor drive means for moving said medium with respect to said head after said write means responds to one of said digits;

read means responsive to said medium moving with respect to said head for providing an output signal from said read winding indicative of the state of a recorded binary digit;

comparison means for directly comparing the digit state indicated by said read means with the state of the digit concurrently provided by said source, said comparison means including a logical exclusive Or circuit coupled at its input to said read means and directly to said source of binary digits; and timing control means for determining a digit time interval T coupled to said write and read means and to the motor drive means, said timing control means including delay means coupled to the read means.

2. The combination of claim 1 wherein said write means responds to said timing control means and to a selected one of said binary digits to introduce a current pulse to said write winding during a first portion of said time interval T for selectively orienting the flux in the medium, and said read means responds to the timing control means via the delay means during a second portion of said interval T to sense signals induced in the read winding indicative of the binary state.

3. The combination of claim 2 wherein said sampling means selectively samples the response of the read means during a sample interval of said second portion of the time interval T which is regulated by the timing control means.

4. The combination of claim 2 wherein said first and second portions of said interval T do not overlap.

5. The system of claim 2 wherein said means for comparing further includes a sampling means coupled to the logical exclusive Or circuit and verify register means coupled to the sampling means.

6. The combination of claim 2 wherein said current pulse is driven through said write winding during the first portion of the time interval T when said medium is held stationary.

References Cited

UNITED STATES PATENTS

| | | | |
|---|---|---|---|
| 2,789,026 | 4/1957 | Nordyke | 340—174.1 |
| 3,056,950 | 10/1962 | Birmingham et al. | 340—174.1 |
| 3,096,511 | 7/1963 | Taras | 340—174.1 |
| 3,196,420 | 7/1965 | Francois | 340—174.1 |
| 3,243,789 | 3/1966 | Ragle | 340—174.1 |
| 3,295,118 | 12/1966 | Brown | 340—174.1 |

BERNARD KONICK, *Primary Examiner.*

TERRELL W. FEARS, *Examiner.*

V. P. CANNEY, *Assistant Examiner.*